United States Patent Office 2,760,612
Patented Aug. 28, 1956

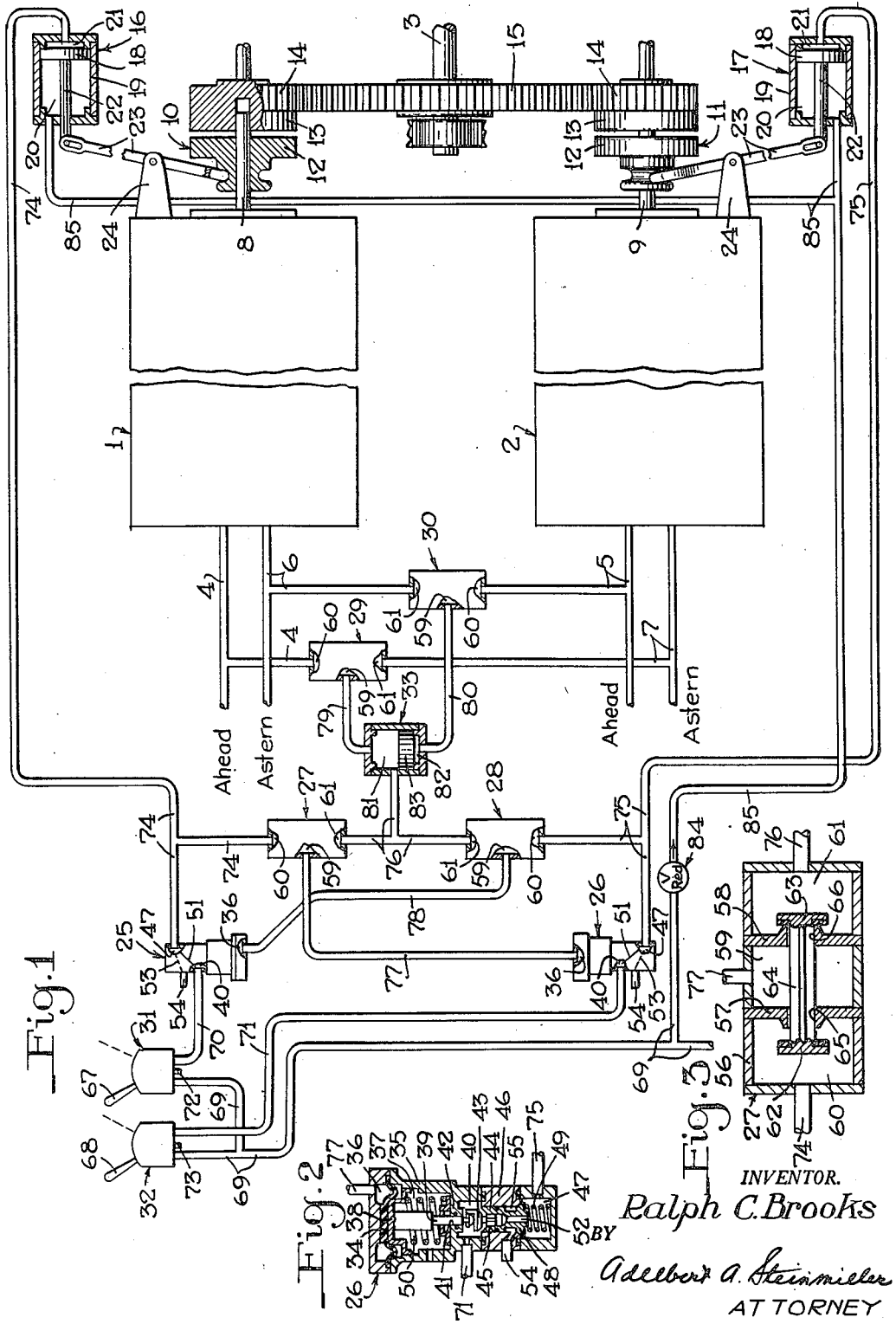

2,760,612

CLUTCH CONTROL APPARATUS

Ralph C. Brooks, Turtle Creek, Pa., assignor to Westinghouse Air Brake Company, Wilmerding, Pa., a corporation of Pennsylvania Application September 30, 1953, Serial No. 383,279

11 Claims. (Cl. 192—.098)

This invention relates to clutch control apparatus and more particularly to fluid pressure actuated clutch control apparatus especially adapted for use with a plurality of engines employed to drive a common driven member.

In the marine field, it is common practice to control the connection of the respective drive shafts of several reversible engines to a single propeller shaft by independently controlling engagement and disengagement of a clutch interposed between each corresponding drive shaft and the propeller shaft. With this type of independent control, it is the practice, on occasion, when rapid maneuvering is desired, to continuously operate one engine "ahead" and another engine "astern" and to control the direction of propulsion of the vessel by selectively engaging one or the other clutch. Under these conditions, considerable damage may be caused to the engines or to the drive mechanism if, through inadvertence or other cause, the operator attempts to engage both clutches simultaneously or to engage one clutch while the other is engaged.

Various arrangements have heretofore been proposed for preventing concurrent engagement of the clutches under the above conditions. One such arrangement comprises a mechanical interlock between the manually operable levers which control engagement of the respective clutches.

An object of this invention is to provide an improved clutch control apparatus embodying novel, fluid pressure controlled interlock means which will automatically prevent concurrent engagement of the respective clutches associated with two reversible engines when their drive shafts are rotating in such directions as would deliver opposing torques to a single propeller shaft; but which will permit concurrent engagement of said clutches when both engines are rotating so as to deliver cumulative torques to said shaft, and which will also allow selective engagement of said clutches under either of the conditions just described.

Another object of this invention is to provide an improved clutch control apparatus of the type indicated in the foregoing object which, by enabling preselection of the direction of propulsion of the vessel prior to engaging the corresponding clutch, reduces to a minimum the operating time required during rapid maneuvering, yet does not impair the aforementioned protection against concurrent engagement.

Other objects and advantages will become apparent from the following more detailed description of the invention.

In the accompanying drawing; Fig. 1 is a schematic view, partly in section and partly in outline, of the improved clutch control apparatus embodying my invention and applied illustratively in association with two reversible marine engines and their cooperative drive mechanism; Fig. 2 is a sectional view showing details of construction of an air-type relay valve device employed in the improved control apparatus; and Fig. 3 is a sectional view showing details of construction of a double check valve device also used in the improved control apparatus.

*Description*

Referring to Fig. 1 of the drawing, the improved clutch control apparatus is provided for controlling the transmission of power from either or both of two reversible marine engines 1, 2 to a single propeller shaft 3. The usual "Ahead" control lines 4, 5 and "Astern" control lines 6, 7 (designated by suitable legends) are selectively chargeable with fluid under pressure, by operation of suitable valve means (not shown), for independently controlling the direction of rotation of the engines 1, 2 and hence of their respective drive shafts 8, 9. Power may be transmitted from the respective drive shafts 8, 9 to the propeller shaft 3 by any suitable means, such as, for example, friction clutch devices 10, 11, respectively, each comprising a driving member 12 having splined engagement with the respective drive shaft and also comprising a driven member 13 keyed for rotation with a respective pinion gear 14 having toothed engagement with a bull gear 15 fixed on said propeller shaft.

Engagement and disengagement of the clutch devices 10, 11 are controlled by fluid pressure operated clutch actuating devices 16, 17, respectively. These devices 16, 17 may each comprise, for sake of illustration, a piston 18 slidably mounted in a hollow, sectionalized cylindrical casing 19 and subject opposingly to pressures of fluid in a low-pressure chamber 20 and in a high-pressure chamber 21. A piston rod 22 coaxially attached at one end to the piston 18 extends through the low-pressure chamber 20 and projects exteriorly thereof in sealed, slidably guided engagement with the wall of an aligned opening in the casing 19. The projecting end of each rod 22 is pivotally connected to one end of a lever 23 which is rockable at a point intermediate its ends relative to a fixed member 24 carried, for example, by the casing of the corresponding engine; and the opposite end of each lever 23 operatively engages the driving member 12 of the corresponding clutch device 10 or 11 for shifting such member axially on the respective shaft 8 or 9 into and out of engagement with the corresponding driven member 13.

According to the invention, the improved clutch control apparatus comprises a novel combination of two identical relay valve devices 25, 26; four identical double check valve devices 27, 28, 29, 30; two identical operator's control valve devices 31, 32; and a shuttle valve 33.

The relay valve device 25, though identical with relay valve device 26, is shown in Fig. 1 of the drawing in an inverted position as compared to the latter. As shown in Fig. 2 of the drawing, the relay valve device 26 may comprise a flexible diaphragm 34 clamped between portions of a sectionalized casing 35 and separating a control chamber 36 from a non-pressure chamber 37. The control chamber 36 is adapted to be charged with fluid under pressure or vented to atmosphere, and the non-pressure chamber 37 is constantly open to atmosphere. The diaphragm 34 is operatively connected, through the medium of a follower 38, to a rod 39 which extends through the non-pressure chamber 37 and projects into a supply chamber 40; said rod having sealed, slidably guided engagement with the wall of an aligned bore 41 extending through a casing partition 42 separating said chambers. A supply valve 43 disposed in supply chamber 40 is attached to the projecting end of rod 39 and is adapted to be carried by said rod into and out of engagement with a suitable seat formed on one end of a plunger 44, which has slidably guided engagement with the wall of an aligned bore 45 extending through a casing partition 46 separating the supply chamber 40 from a delivery chamber 47. At the opposite end of plunger 44 is an integrally formed exhaust valve 48 disposed in chamber 47 and urged, as by a helical spring 49, into engagement with a suitable seat provided in partition 46 in encirclement of bore 45.

In operation, when the control chamber 36 is vented to atmosphere, a helical spring 50 disposed in non-pressure chamber 37 and acting on the follower 38 urges the diaphragm 34 into a release position, in which it is shown in Fig. 2 of the drawing. As the diaphragm 34 moves to release position, it carries rod 39, hence enabling the spring 49 to seat the exhaust valve 48, whereupon continued movement of said rod will cause unseating of the supply valve 43, for thereby establishing a fluid pressure connection between the supply chamber 40 and delivery chamber 47 by way of the unseated valve 43 and an opening 52 extending axially through the plunger 44; said connection, which will hereinafter be referred to as connection 51, is represented schematically in Fig. 1 by a line bearing the reference numeral 51 and connecting the chambers 40, 47.

When fluid under pressure is supplied to control chamber 36, however, the diaphragm 34 will deflect against resistance of spring 50 and cause rod 39 to successively seat the supply valve 43 and then through seating of said valve to advance the plunger 44 against resistance of spring 49 for thereby unseating the exhaust valve 48. Under such condition, a vent connection is established whereby the delivery chamber 47 is connected to an atmospheric vent pipe 54 past the unseated exhaust valve 48 and through an annular recess 55 encircling the plunger 44; said vent connection, which will hereinafter be referred to as connection 53, is represented schematically in Fig. 1 by a broken line bearing the reference numeral 53 and connecting chamber 47 and pipe 54.

As shown in Fig. 3 of the drawing, the double check valve device 27 (and also double check valve devices 28, 29, 30) may comprise a sectionalized hollow cylindrical casing 56 having two, axially spaced apart, interior partitions 57, 58 defining therebetween a delivery chamber 59 and further defining, in cooperation with the respective ends of the casing, control chambers 60, 61, respectively. Check valves 62, 63 of equal effective areas are disposed in chambers 60, 61, respectively, and are coaxially connected to the respective ends of a fluted stem 64 which is slidably accommodated in coaxially aligned bores 65, 66 extending through the partitions 57, 58, respectively. The length of stem 64 is such that one of check valves 62 or 63 is in seating engagement with an annular valve seat on the corresponding partition 57 or 58, while the other check valve is unseated from its corresponding seat.

In operation, when there is a disparity in the pressures of fluid in the control chambers 60, 61, pressure of fluid in the more highly pressurized of said chambers will cause seating of the check valve in that chamber, thereby unseating the check valve in the other chamber through the medium of the stem 64 and consequently opening said other chamber to the delivery chamber 59. It follows, therefore, that if either of the control chambers 60 or 61 is vented to atmosphere the delivery chamber 59 will likewise be vented to atmosphere.

Referring now to Fig. 1 of the drawing, the operator's control valve devices 31, 32 may be of any suitable type comprising valve means (not shown) operable by movement of respective handles 67, 68 to a supply position to connect branches of a fluid pressure supply pipe 69 to pipes 70, 71, respectively, which, in turn, are connected to the supply chambers 40 of relay valve devices 25, 26, respectively; said valve means also being operable by movement of said handles to a release position (in which they are shown in Fig. 1 of the drawing) to connect the pipes 70, 71 to vent pipes 72, 73, respectively, for thereby venting said supply chambers of devices 25, 26 to atmosphere.

The delivery chambers 47 of devices 25, 26 are connected to the high-pressure chambers 21 of clutch actuating devices 16, 17 by way of delivery pipes 74, 75, respectively. Branches of the delivery pipes 74, 75 are connected to the control chambers 60 of double check valve devices 27, 28, respectively; and the control chambers 61 of said valve devices are connected to each other by a pipe 76. The delivery chambers 59 of the double check valve devices 27, 28 are connected to the control chambers 36 of the relay valve devices 26, 25, by pipes 77, 78, respectively.

The control chambers 60 of the double check valve devices 29, 30 are connected to branches of the "Ahead" control lines 4, 5, respectively; and the control chambers 61 of said valve devices are connected to branches of the "Astern" control lines 7, 6, respectively. The delivery chambers 59 of valve devices 29, 30 are connected by pipes 79, 80 to chambers 81, 82, respectively, of shuttle valve 33, the latter chambers being separated by a piston valve 83 slidably mounted in a sectionalized, hollow cylindrical casing. The piston valve 83 is operative, when either pipe 79 or 80 is charged with fluid under pressure, to cause fluid to flow from such charged pipe through the corresponding chamber 81 or 82 to a branch of the pipe 76 and, at the same time, to prevent flow of such fluid into the uncharged pipe 80 or 79.

It should be noted that pipe 76 will be charged with fluid under pressure only if pipe 79 or 80 is so charged; that pipe 79 will be charged only if the control lines 4, 7 are concurrently charged, as will occur only when the respective drive shafts 8, 9 of engines 1, 2 are rotating in ahead and astern directions, respectively; and that pipe 80 will be charged with fluid under pressure only if the control lines 6, 5 are concurrently charged, as will occur only if said drive shafts are rotating in astern and ahead directions, respectively. Under all other conditions, the pipe 76 will be vented to atmosphere, thereby causing the control chambers 36 of the relay valve devices 25, 26 to likewise be vented to atmosphere by way of pipes 78, 77, respectively, and the pipe 76.

A fluid pressure reducing valve 84 of any suitable type is adapted to be supplied with fluid under pressure from a branch of the supply pipe 69 and to deliver fluid at a constant reduced pressure via branches of a pipe 85 to the respective low-pressure chambers 20 of the clutch actuating devices 16, 17 for urging the respective pistons 18 to a release position in which the corresponding clutch devices 10, 11 are disengaged although it will, of course, be understood that any other suitable bias means may be used to urge the pistons 18 to release position.

According to a feature of the invention, the pressure of fluid thus supplied to the respective chambers 20 exerts a greater biasing force on the corresponding pistons 18 of devices 16, 17 than the springs 50 of relay valve devices 25, 26 exert on the corresponding diaphragm 34; this disparity in biasing force being essential to assure that the clutch devices 10, 11 may not be engaged concurrently when the drive shafts 8, 9 are rotating in opposing directions, as will be demonstrated subsequently.

Operation

In operation, assume initially that the handles 67, 68 of operator's control valve devices 31, 32 are both in release position; that the "Ahead" control line 4 and "Astern" control line 7 of the engines 1, 2, respectively, are charged with fluid under pressure and the control lines 6, 5 of the respective engines are vented to atmosphere, in consequence of which the drive shafts 8, 9 of said engines are rotating in ahead and astern directions, respectively.

Under these assumed conditions, the respective components of the improved clutch control apparatus will be in the positions in which they are shown in the several figures of the drawing.

With the handles 67, 68 in release position, clutch devices 10, 11 will be disengaged because the respective high-pressure chambers 21 of clutch actuating devices 16, 17 will be vented to atmosphere by way of pipes 74, 75, the corresponding fluid pressure connections 51 of relay valve devices 25, 26, pipes 70, 71 and vent pipes 72, 73.

respectively. The connections 51 in devices 25, 26 will have been established because the respective diaphragms 34 of said devices will be in release position by virtue of the vented condition of the respective control chambers 36, which are in fluid pressure communication with the vented pipes 75, 74, respectively, by way of pipes 78, 77 and the respective chambers 59 of double check valve devices 28, 27. The chamber 82 of shuttle valve 33 will be vented to atmosphere by way of the pipe 80, double check valve device 30, and the vented control line 6 or 5; but since the control lines 4, 7 are concurrently charged with fluid under pressure, the delivery chamber 59 of double check valve device 29, and hence the pipe 79, chamber 81 of shuttle valve 33, pipe 76 and the respective control chambers 61 of double check valve devices 27, 28 will likewise be charged, thereby holding the respective check valves 63 (Fig. 3) of the latter devices seated. Thus, the charged condition of pipe 76 will be of no consequence under the above condition.

Assuming now that the operator desires to maneuver the vessel rapidly ahead, he moves the handle 67 of control valve device 31 to supply position, thereby causing fluid under pressure to flow from supply pipe 69 to pipe 70 and thence through the connection 51 of relay valve device 25 to pipe 74. From pipe 74, fluid under pressure will flow through the double check valve device 27 (since pipe 76 is already charged with fluid under pressure) and via pipe 77 to the control chamber 36 of relay valve device 26; and such fluid will, at the same time, flow from pipe 74 to the high-pressure chamber 21 of clutch actuating device 16.

When the pressure of fluid in pipe 74, and hence in chamber 36 of device 26, has increased to a certain predetermined value, deflection of the respective diaphragm 34 against resistance of spring 50 will cause the rod 39 to seat supply valve 43 and then establish vent connection 53, for thereby venting delivery pipe 75 to atmosphere by way of vent pipe 54, as will be understood from previous description. When the pressure of fluid in pipe 74, and hence in chamber 21 of device 16, has increased to a predetermined higher value, the piston 18 of said device will move to an application position, against resistance of pressure of fluid in low-pressure chamber 20, for thereby causing the lever 23 to rock about fixed member 24 and engage the clutch device 10, which, in turn, causes the pinion gear 14 to drive the bull gear 15 and hence the propeller shaft 3 in an ahead direction.

It will be noted that as the pressure of fluid in pipe 74 increased, the pipe 75 was vented to atmosphere before the clutch device 10 was engaged; this result being obtained by virtue of the lesser biasing force of the spring 50 of relay valve device 26 as compared to that of the pressure of fluid in low-pressure chamber 20 of device 16, as pointed out in previous description.

Assuming now that the operator moves the handle 68 of control valve device 32 to supply position, fluid under pressure will flow from supply pipe 69 to pipe 71 and thence to supply chamber 40 of relay valve device 26. Since the pipe 74 and hence control chamber 36 of valve device 26 are still charged with fluid under pressure, the supply valve 43 (Fig. 2) of said valve device will remain seated, and it will thus be noted that it is impossible to charge the delivery pipe 75 with fluid under pressure and hence impossible to engage the clutch device 11. In practice, the operator may therefore desire to precharge the pipe 71 and the corresponding supply chamber 40 with fluid under pressure, in the manner just described, so that the vessel may be maneuvered astern more rapidly should circumstances thereafter require (although, if preferred, the pipe 70 may be vented before the pipe 71 is charged with fluid under pressure, by successively moving handle 67 to release position and then moving handle 68 to supply position).

Assume now that the clutch device 10 is engaged for causing the propeller shaft 3, and hence the vessel, to be driven in an ahead direction; that pipe 71 is precharged with fluid under pressure in the manner just described; and that it is now desired to maneuver the vessel rapidly astern.

The operator accordingly moves the handle 67 of control valve device 31 to release position, thereby venting pipe 74 to atmosphere by way of connection 51 of relay valve device 25, pipe 70 and pipe 72. As the pressure of fluid in pipe 74, and hence in both the high-pressure chamber 21 of clutch actuating device 16 and in the control chamber 36 of relay valve device 26, reduces toward atmospheric, the device 16 will first operate to effect disengagement of clutch device 10 and then device 26 will operate to establish the connection 51 whereby fluid under pressure will flow from the precharged pipe 71 to delivery pipe 75; such successive operation of the respective devices resulting from the aforementioned lesser biasing force of spring 50 of device 26 as compared to that of pressure of fluid in chamber 20 of device 16, which assures that the clutch device 10 will be disengaged before fluid under pressure is supplied to pipe 75. Fluid under pressure thus supplied to pipe 75 will flow through double check valve device 28 (since pipe 76 is still charged) and thence through pipe 78 to control chamber 36 of relay valve device 25, causing vent connection 53 to be established in the latter device whereby pipe 74 is vented to atmosphere by way of vent pipe 54; and such fluid in pipe 75 will also flow to the high-pressure chamber 21 of clutch actuating device 17, thereby causing the clutch device 11 to be engaged for driving the vessel in an astern direction, as will be understood from previous description. If desired, the operator may now move handle 67 of control valve device 31 to supply position for thereby precharging pipe 70 and supply chamber 40 of relay valve device 25, since supply valve 43 (Fig. 2) of the latter device will remain seated until the handle 68 of control valve device 32 is moved to release position for venting pipe 75 and hence control chamber 36 of device 25 to atmosphere, as will be understood from the foregoing.

Assume now that the clutch device 11 is engaged because pipe 75 is charged with fluid under pressure and pipe 74 is vented, and that the operator now desires to disengage said clutch device without engaging the clutch device 10. If the operator had previously moved the handle 67 of control valve device 31 to supply position in order to precharge pipe 70, said handle should first be moved to release position to vent said pipe to atmosphere. With pipe 70 vented, the operator then moves handle 68 of control valve device 32 to release position for venting pipe 75 to atmosphere by way of connection 51 of relay valve device 26, pipe 71 and pipe 73. As fluid under pressure is thus vented from pipe 75, it will likewise be vented from control chamber 36 of relay valve device 25, causing said device to disestablish the vent connection 53 and establish connection 51; but since pipe 70 is already vented to atmosphere by virtue of handle 67 being in release position, the connection 51 will merely maintain the pipe 74 vented.

Assume now that with pipes 74, 75 both vented to atmosphere, in the manner just described, the operator inadvertently moves the handles 67, 68 simultaneously into their respective supply positions. Fluid under pressure will thus flow from pipe 70 through the connection 51 of relay valve device 25 to pipe 74, and at the same time fluid under pressure will also flow from pipe 71 through connection 51 of relay valve device 26 to pipe 75. In view of the previously described lesser biasing force of the respective springs 50 of devices 26, 25, fluid under pressure supplied concurrently to pipes 74, 75 will flow therefrom to the corresponding control chambers 36 of devices 26, 25, respectively, and cause one or the other of these devices to establish the connection 53 before the pressure of fluid in said pipes has increased sufficiently to overcome the biasing forces of the pressures of fluid in the respective low-pressure chambers 20 of the clutch actuating devices 16, 17. One or the other of the devices 26, 25 will establish the connection 53, as just stated, for venting the corresponding pipe 75 or 74 to atmosphere and thereby enabling engagement of the clutch device 10 or 11, respectively, because of normal variation in pipe friction, in spring force of the respective springs 50 and in the frictional resistance of the moving parts of the respective devices 26, 25. Hence concurrent engagement of the clutch devices 10, 11 will be prevented.

If, on the other hand, the handles 67, 68 are successively moved to their respective supply positions, but within a very short time interval, fluid under pressure thus supplied to pipe 74 will flow to control chamber 36 of relay valve device 26 and cause the latter device to vent the pipe 75 to atmosphere by way of its respective vent pipe 54 thereby preventing engagement of clutch device 11 and enabling engagement of clutch device 10, as will be understood from the foregoing.

Assume now that the drive shafts 8, 9 of the respective engines 1, 2 are both rotating in the ahead direction and that the handles 67, 68 are in their respective release positions.

Under these conditions, the "Ahead" control llines 4, 5 will be simultaneously charged with fluid under pressure and the "Astern" control lines 6, 7 will be simultaneously vented to atmosphere. Since the respective control chambers 61 of double check valve devices 29, 30 are connected to the vented lines 7, 6, respectively, said devices will vent the pipes 79, 80, respectively, and hence vent the pipe 76, the respective control chambers 61 of the double check valve device 27, 28, the corresponding pipes 77, 78 and the respective control chambers 36 of the relay valve devices 26, 25, as will be understood from previous description. With the respective control chambers 36 of relay valve devices 25, 26 thus concurrently vented to atmosphere, said devices will operate to establish the respective connections 51. If the operator moves handles 67, 68 either simultaneously or successively to supply position, fluid under pressure thus supplied to the pipes 74, 75, respectively, will merely seat the check valves 62 (Fig. 3) in chambers 60 of double check valve devices 27, 28, respectively, and thereby maintain the respective control chambers 36 of devices 26, 25 vented to atmosphere by way of vented pipe 76. Hence both clutch devices 10, 11 may be engaged concurrently by pressure of fluid supplied to the pipes 74, 75, respectively, as will be understood from preceding description, for thereby delivering cumulative driving torques to the propeller shaft 3.

If, on the other hand, the drive shafts 8, 9 are both rotating in the astern direction, the same result will follow, because the control chambers 36 of relay valve devices 26, 25 will be vented to atmosphere by way of the pipe 76 which, in turn, will be vented by way of the respective control chambers 60 of the double check valve devices 29, 30 which are connected to the vented "Ahead" control lines 4, 5, respectively.

Thus, when the drive shafts 8, 9 are rotating in the same direction, whether it be the ahead or astern direction, the respective control chambers 36 of devices 25, 26 will be vented to atmosphere and the clutch devices 10, 11 may therefore be engaged at will, either concurrently or selectively.

*Summary*

It will now be seen that the improved clutch apparatus embodies novel, fluid pressure controlled inferlock means which positively prevents concurrent engagement of the respective clutch devices when the drive shafts are rotating in opposing directions (i. e., such as would transmit opposing torques to the propeller shaft); yet said interlock means allows concurrent engagement of said clutch devices when said drive shafts are rotating in the same direction (i. e., such as would deliver cumulative torques to said propeller shaft), and also allows selective engagement of said clutch devices under either of the above conditions. It will also be seen that when the drive shafts are rotating in opposing directions, very rapid change of rotational direction of the propeller shaft may be obtained by precharging a portion of the improved clutch control apparatus with fluid under pressure so that, as soon as one clutch device is disengaged, the other clutch device may be engaged in a minimum period of time for thereby facilitating rapid maneuvering of the vessel.

Having now described my invention, what I claim as new and desire to secure by Letters Patent, is:

1. The combination of two clutch devices each arranged to control the transmission of driving power from a corresponding reversible engine to a common driven shaft, manually operable means for normally controlling engagement and disengagement of said clutch devices selectively or concurrently, control means for each engine adapted to be variously conditioned for causing such engine to rotate in one direction or the opposite direction, and interlock means controlled jointly by conditioning of said control means and said manually operable means for preventing operation of said manually operable means from being effective to cause concurrent engagement of said clutch devices when said control means are conditioned for causing the engines to rotate in such respective directions as would apply opposing torques to the shaft.

2. The combination of two clutch devices each arranged to control the transmission of driving power from a corresponding reversible engine to a common driven shaft, fluid pressure responsive means for effecting engagement and disengagement of said clutch devices, manually operated means for so controlling the supply of fluid under pressure to and the release of fluid under pressure from said fluid pressure responsive means as to effect engagement of said clutch devices selectively or concurrently, fluid pressure control lines for each engine adapted to be variously pressurized for causing the corresponding engine to rotate in one direction or the opposite direction, and fluid pressure responsive interlock means controlled jointly by pressures of fluid in said control lines and by fluid under pressure supplied by said manually operated means in such manner that said manually operated means are effective to cause selective, but not concurrent, engagement of said clutch devices so long as the said control lines are conditioned to cause the engines to rotate such as to apply opposing torques to the driven shaft.

3. The combination of two clutch devices each arranged to control the transmission of driving power from a corresponding reversible engine to a common driven shaft, two clutch actuators each arranged to control operation of a corresponding clutch device and each biased to a position for disengaging such clutch device and adapted to be charged with fluid under pressure for effecting engagement of the corresponding clutch device, fluid pressure control lines for each engine adapted to be variously charged with fluid under pressure for effecting rotation of the corresponding engine in one direction or the opposite direction, fluid pressure responsive interlock means controlled jointly by pressures of fluid in the said control lines and in the said actuators in such manner as to prevent concurrent charging of said clutch actuators so long as said control lines are conditioned to cause the engines to rotate so as to deliver opposing torques to the shaft.

4. The combination according to claim 3, wherein said interlock means is inoperative to prevent concurrent charging of said clutch actuators so long as said control lines are conditioned for causing the engines to rotate so as to deliver cumulative torques to the shaft.

5. The combination of two clutch devices each adapted to transmit driving power from a drive shaft of a corresponding engine to a common driven shaft, an ahead and an astern control line for each engine selectively chargeable with fluid under pressure and ventable to atmosphere for controlling rotational direction of the respective drive shaft, bias means for each clutch device for normally effecting disengagement of such clutch device, a pipe for each clutch device chargeable with fluid under pressure for effecting engagement of the corresponding clutch device, manually operable control valve means for charging and venting the respective pipes selectively or concurrently, a pair of relay valve devices each having a control chamber normally vented for establishing fluid pressure communication between said control valve means and one of said pipes but responsive to charging of said control chamber for closing said communication and venting the respective pipe, a conduit, first valve means operative in response to concurrent charging of the ahead control line of one of the engines and astern control line of the other engine to charge said conduit with fluid under pressure, and second valve means operative in response to concurrent charging of said conduit and one of said pipes to supply fluid under pressure to the control chamber of the relay valve device associated with the other of said pipes for causing venting of the latter pipe, thereby to prevent concurrent engagement of said clutch devices.

6. The combination according to claim 5, wherein said relay valve devices are operative to vent the corresponding pipe to atmosphere when pressure of fluid in their respective control chambers exceeds a certain value which is lower than that required in said pipes to effect engagement of the clutch devices against resistance of their respective bias means.

7. The combination of two fluid pressure operated actuators for corresponding clutch devices arranged, respectively, to transmit driving power from a corresponding one of two reversible engines to a common driven member, bias means for each of said actuators for normally urging the corresponding actuator to a clutch-disengaging position, ahead and astern control lines for each of said engines chargeable, selectively, with fluid under pressure for independently controlling the direction of rotation of said engines, manually operable control valve means for selectively or concurrently supplying fluid under pressure to said actuators for causing operation thereof to a clutch-engaging position, a pair of relay valve devices each having a control chamber normally vented to atmosphere for establishing fluid pressure communication between said control valve means and one of said actuators but responsive to charging of said control chamber to close said communication for preventing operation thereof to its clutch-engaging position, a conduit, a shuttle valve controlling pressure of fluid in said conduit, a first pair of double check valves each having two control chambers connected, respectively, to the ahead and astern control lines of a different one of said engines and each having a delivery chamber connected to opposite ends of said shuttle valve, each of said double check valves being operative alternatively of the other upon concurrent charging of both its respective control chambers to effect charging of said conduit by way of said shuttle valve, a second pair of double check valves each operative alternatively of the other upon concurrent charging of said conduit and a respective one of said actuators to charge the control chamber of the respective relay valve device associated with the other actuator for thereby closing said communication to said other actuator.

8. The combination of two clutch devices for controlling transmission of driving power from a corresponding reversible engine to a common driven shaft, fluid pressure motor means for each clutch device and each biased to one position for normally effecting disengagement of the corresponding clutch device and operable by fluid under pressure to another position for effecting engagement of the corresponding clutch device, operator-controlled means controlling supply of fluid under pressure to and release of fluid under pressure from said motor means, an "ahead" and an "astern" control line for each of the engines adapted to effect rotation of the respective engine in a corresponding direction upon selective pressurization thereof, and fluid pressure controlled means responsive to pressurization of said "ahead" control line of one of the engines and "astern" control line of the other engine concurrently with supply of fluid under pressure to one of said motor means to prevent supply of fluid under pressure to the other of said motor means for thereby preventing operation of said other motor means to its said other position, and said fluid pressure controlled means being ineffective at all other times to prevent concurrent supply of fluid under pressure to both of said motor means.

9. The combination of two clutch devices each adapted to transmit driving power from a corresponding reversible engine to a common driven shaft, a fluid pressure motor for each clutch device, means normally biasing each said motor to one position for effecting disengagement of the corresponding clutch device, a conduit for each motor chargeable with fluid under pressure for actuating the corresponding motor to another position for effecting engagement of the corresponding clutch device, manually operable control valve means for charging and venting the conduits selectively or concurrently, a pair of fluid pressure responsive valve means each of which is interposed between said manually operable valve means and a respective one of said conduits and is normally ineffective to prevent charging of such conduit and is effective only upon operation by an operating fluid pressure to prevent the charging of such conduit, certain means for each engine adapted to be variously conditioned for controlling the direction of rotation of the corresponding engine, and means controlled jointly by the pressure of fluid in the respective conduits and by conditioning of said certain means and operative only when said certain means are conditioned for causing the engines to rotate so as to deliver opposing torques to the shaft and one of said conduits is charged, to cause operating fluid under pressure to be supplied to the fluid pressure responsive valve means associated with the other conduit for preventing charging of said other conduit.

10. In an apparatus for controlling engagement of two clutch devices each adapted to transmit driving power from a corresponding reversible engine to a common driven shaft, the combination of a fluid pressure motor for each clutch device, bias means for urging each motor to one position for normally effecting disengagement of the corresponding clutch device, a pair of conduits one of which is provided for each motor and each of which is chargeable with fluid under pressure for thereby causing operation of the corresponding motor to another position for effecting engagement of the corresponding clutch device, manually operable control valve means for charging and venting the conduits selectively or concurrently, a pair of relay valve devices each having a supply chamber connected to said control valve means, an exhaust chamber open to atmosphere, a delivery chamber connected to a corresponding one of said conduits and normally open to said supply chamber, and also having a control chamber normally vented to atmosphere and adapted to be charged with fluid under pressure for thereby causing said delivery chamber to be closed to said supply chamber and opened to said exhaust chamber, controlling means for each engine for effecting operation of the respective engine in ahead and astern directions selectively, and fluid pressure controlled interlock means controlled jointly by said controlling means and by pressure of fluid in said conduits and operative, only when said controlling means are conditioned for causing said engines to rotate in ahead and astern directions respectively and one of the conduits is charged, to charge the control chamber of the relay valve device associated with the other conduit for thereby disconnecting said other conduit from said control valve means and venting said other conduit and thus preventing operation of its corresponding motor to said other position.

11. The combination of two fluid pressure operated actuators each having a clutch-engaging position for enabling transmission of power from a corresponding one of two reversible engines to a common driven member, means normally urging each of said actuators to a clutch-disengaging position, an ahead control line and an astern control line for each engine chargeable selectively with fluid under pressure for causing rotation of the corresponding engine in an ahead or an astern direction respectively, a pair of operator's fluid pressure control valve devices each operable independently of the other for controlling supply of fluid under pressure to a respective one of said actuators for thereby causing operation of the corresponding actuator to clutch-engaging position, a pair of relay valve devices each having a control chamber and operative only upon charging of its respective control chamber to cut off a corresponding one of said actuators from its corresponding control valve device, and valve means controlled jointly by pressures of fluid in said ahead and astern control lines of both of the engines and by pressures of fluid supplied to said actuators and operative to vent said control chambers except when the ahead control line of one engine and the astern control line of the other engine and one of said actuators are concurrently charged with fluid under pressure and then operative to supply fluid under pressure to the control chamber of relay valve device associated with the other of said actuators for causing operation of the latter valve device to prevent charging of said other actuator.

References Cited in the file of this patent

UNITED STATES PATENTS

| | | |
|---|---|---|
| 2,283,133 | Allen et al. | May 12, 1942 |
| 2,428,457 | Hines | Oct. 7, 1947 |
| 2,464,986 | Miller | Mar. 22, 1949 |
| 2,482,300 | Stevens et al. | Sept. 20, 1949 |
| 2,518,781 | Hindmarch | Aug. 15, 1950 |
| 2,559,740 | Sinclair | July 10, 1951 |
| 2,627,168 | Stevens | Feb. 3, 1953 |